US011556131B2

(12) United States Patent
Kim

(10) Patent No.: US 11,556,131 B2
(45) Date of Patent: Jan. 17, 2023

(54) ROBOT

(71) Applicant: LG ELECTRONICS INC., Seoul (KR)

(72) Inventor: Moonchan Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 455 days.

(21) Appl. No.: 16/502,998

(22) Filed: Jul. 3, 2019

(65) Prior Publication Data

US 2020/0293056 A1    Sep. 17, 2020

(30) Foreign Application Priority Data

Mar. 13, 2019   (WO) ................ PCT/KR2019/002905

(51) Int. Cl.
*B25J 5/00*    (2006.01)
*G05D 1/02*    (2020.01)
(Continued)

(52) U.S. Cl.
CPC .............. *G05D 1/0231* (2013.01); *B25J 5/00* (2013.01); *B25J 11/008* (2013.01); *B25J 19/023* (2013.01); *G05D 1/0011* (2013.01)

(58) Field of Classification Search
CPC ... B60R 25/045; B60R 25/2018; B60R 25/24; B60R 25/01; G07C 5/008; G07C 5/0808; G07C 9/00571; G07C 2205/02; H04W 12/77; H04W 4/38; H04W 4/70; H04W 52/16; H04W 52/246; H04W 52/362; G06K 9/00771; G06K 9/6263; G06K 2009/00644; G06K 2209/09; G06K 9/00637; G06K 9/00979; G08B 13/1672; G08B 15/00; G08B 19/005; G08B 21/0438; G08B 21/14; G08B 25/009; G08B 25/06; G08B 25/10;
(Continued)

(56) References Cited

U.S. PATENT DOCUMENTS 4,699,530 A    10/1987   Satoh et al.
7,158,859 B2 *  1/2007   Wang ....................... B25J 5/007
                                                318/568.11
(Continued)

FOREIGN PATENT DOCUMENTS

CN       108000559        5/2018
JP       2018-017157      2/2018
(Continued)

OTHER PUBLICATIONS

Alspach et al., Design of a soft upper body robot for physical human-robot interaction, 2015, IEEE, p. 290-296 (Year: 2015).*
(Continued)

*Primary Examiner* — Mcdieunel Marc
(74) *Attorney, Agent, or Firm* — KED & Associates LLP

(57) ABSTRACT

A robot includes a base, at least one roller bearing having an inner hub supported to the base and an outer hub rotated about the inner hub, a spacer contacting the outer hub, a spin body to which the spacer is attached, and a spin mechanism coupled to the spin body to rotate the spin body. The spacer separates the spin body from the roller bearing between the spin body and the roller bearing. A surface hardness of the spacer is greater than a surface hardness of the spin body.

16 Claims, 11 Drawing Sheets

(51) Int. Cl.
  *B25J 19/02* (2006.01)
  *B25J 11/00* (2006.01)
  *G05D 1/00* (2006.01)
(58) Field of Classification Search
  CPC ...... G08B 27/001; G08B 29/183; B25J 9/102;
    B25J 9/126; B25J 11/0005; B25J 11/008;
    B25J 13/006; B25J 13/06; B25J 19/023;
    B25J 5/00; B25J 9/0003; B25J 9/0009;
    B25J 9/103; B25J 9/0006; B25J 9/1697;
    B25J 9/1664; B25J 9/1633; B25J 9/1666;
    G05B 19/4185; G05B 23/0229; G05B
    23/0264; G05B 23/0283; G05B 23/0294;
    G05B 23/0297; G05B 19/042; G05B
    19/0426; G05B 2219/31457; H04B
    17/3913; Y02P 90/02; F16H 19/001;
    F16H 1/20; F16H 2057/02034; F16H
    57/039; G05D 1/0011; G06F 3/0484;
    A63H 13/00; A63H 13/005; A63H 13/04;
    A63H 33/005; Y10S 901/01
  See application file for complete search history.

(56) References Cited

U.S. PATENT DOCUMENTS

| | | | |
|---|---|---|---|
| 8,374,721 B2* | 2/2013 | Halloran | G05D 1/0242 700/245 |
| 8,939,652 B2* | 1/2015 | Peterson | F16C 33/32 384/569 |
| 2012/0197439 A1 | 8/2012 | Wang et al. | |
| 2015/0330486 A1* | 11/2015 | Hu | F16H 25/12 74/89.14 |
| 2019/0389055 A1* | 12/2019 | Kim | B25J 9/0003 |

FOREIGN PATENT DOCUMENTS

| | | |
|---|---|---|
| KR | 10-2014-0040094 | 4/2014 |
| KR | 10-2018-0068218 | 6/2018 |
| KR | 10-2018-0079826 | 7/2018 |

OTHER PUBLICATIONS

Henson et al., The utilization of duplex worm gears in robot manipulator arms: A design, build and test approach, 2012, IEEE, p. 1-4 (Year: 2012).*

Kaouche et al., Modularity for maximum mobility and manipulation: Control of a reconfigurable legged robot with series-elastic actuators, 2015, IEEE, p. 1-8 (Year: 2015).*

Kim et al., Design of roller-cam clutch mechanism for energy efficiency and high backdrivability of lower extremity exoskeleton, 2015, IEEE, p. 1144-1148 (Year: 2015).*

International Search Report dated Dec. 12, 2019 issued in International Application No. PCT/KR2019/002905.

* cited by examiner

ROBOT

CROSS-REFERENCE TO RELATED APPLICATION(S)

The present application claims priority under 35 U.S.C. 119 and 35 U.S.C. 365 to Patent Cooperation Treaty Application No. PCT/KR2019/002905, filed in Korea on Mar. 13, 2019, which is hereby incorporated by reference in its entirety.

BACKGROUND

1. Field

The present disclosure relates to a robot.

2. Background

Robots may be machines that automatically process given tasks or operate with their own capabilities. The application fields of robots may be classified into industrial robots, medical robots, aerospace robots, and underwater robots, for example. Recently, communication robots that can communicate with humans by voices or gestures have become more prevalent.

Communication robots may provide users with visual information or auditory information and may three-dimensionally move while being panned or tilted. An example of such a communication robot is disclosed in Korean Patent Application Publication No. 10-2014-0040094 A (published on Apr. 2, 2014) whose entire disclosure is hereby incorporated by reference in its entirety.

The communication robot may include a head supporting an interfacing module, a neck, and a body. The robot further may include a rotator rotating the head relative to the body, and a tilter tilting the head by a predetermined angle relative to the body independently of the rotator. The tilter may include a tilter motor moving the head in an angle range of +/−90 degrees with respect to Z axis.

BRIEF DESCRIPTION OF THE DRAWINGS

Embodiments will be described in detail with reference to the following drawings in which like reference numerals refer to like elements and, wherein.

DETAILED DESCRIPTION

Figure 1:
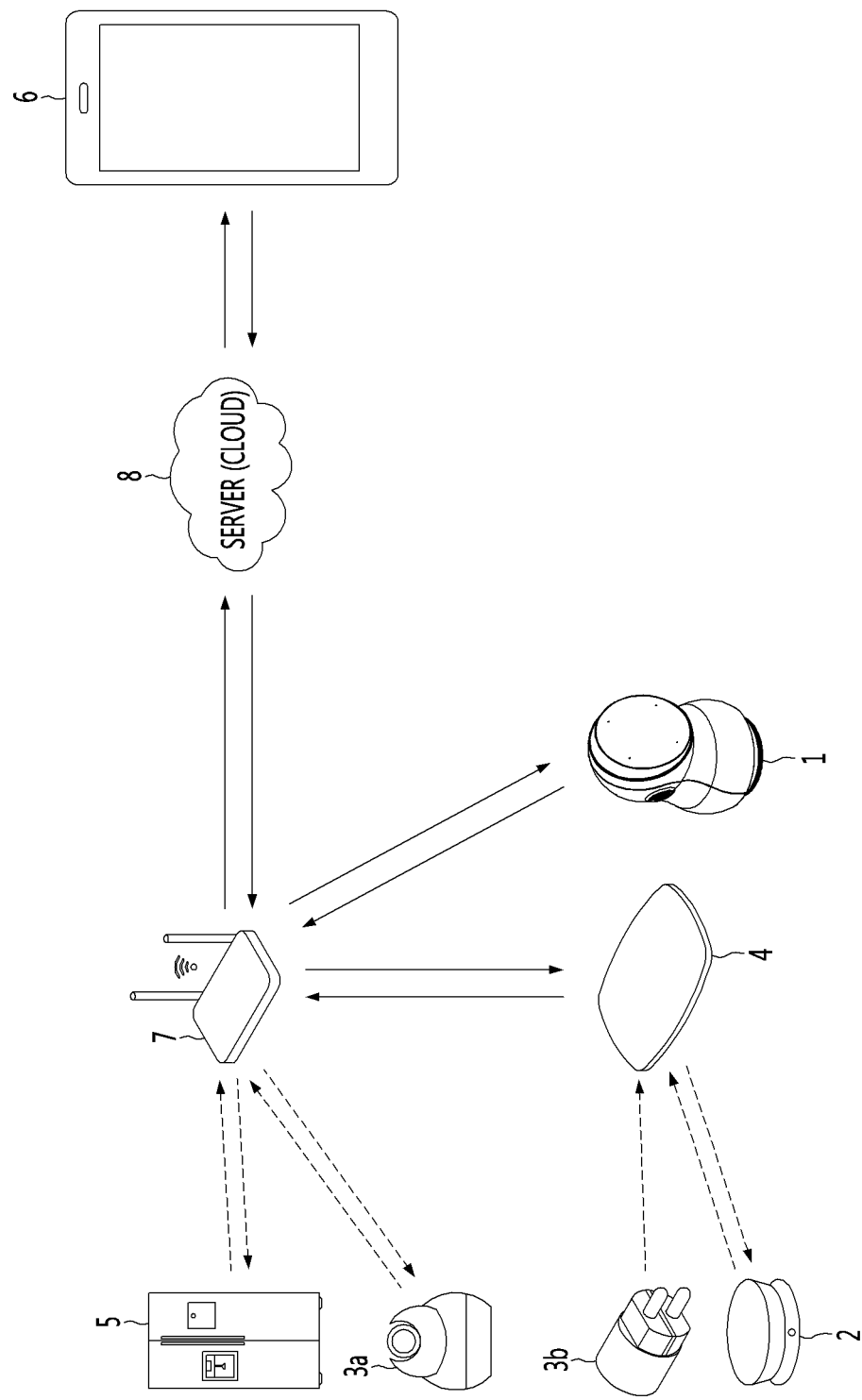
FIG. 1 illustrates an example of a network system to which a robot according to an embodiment is applied.
Figure 2:
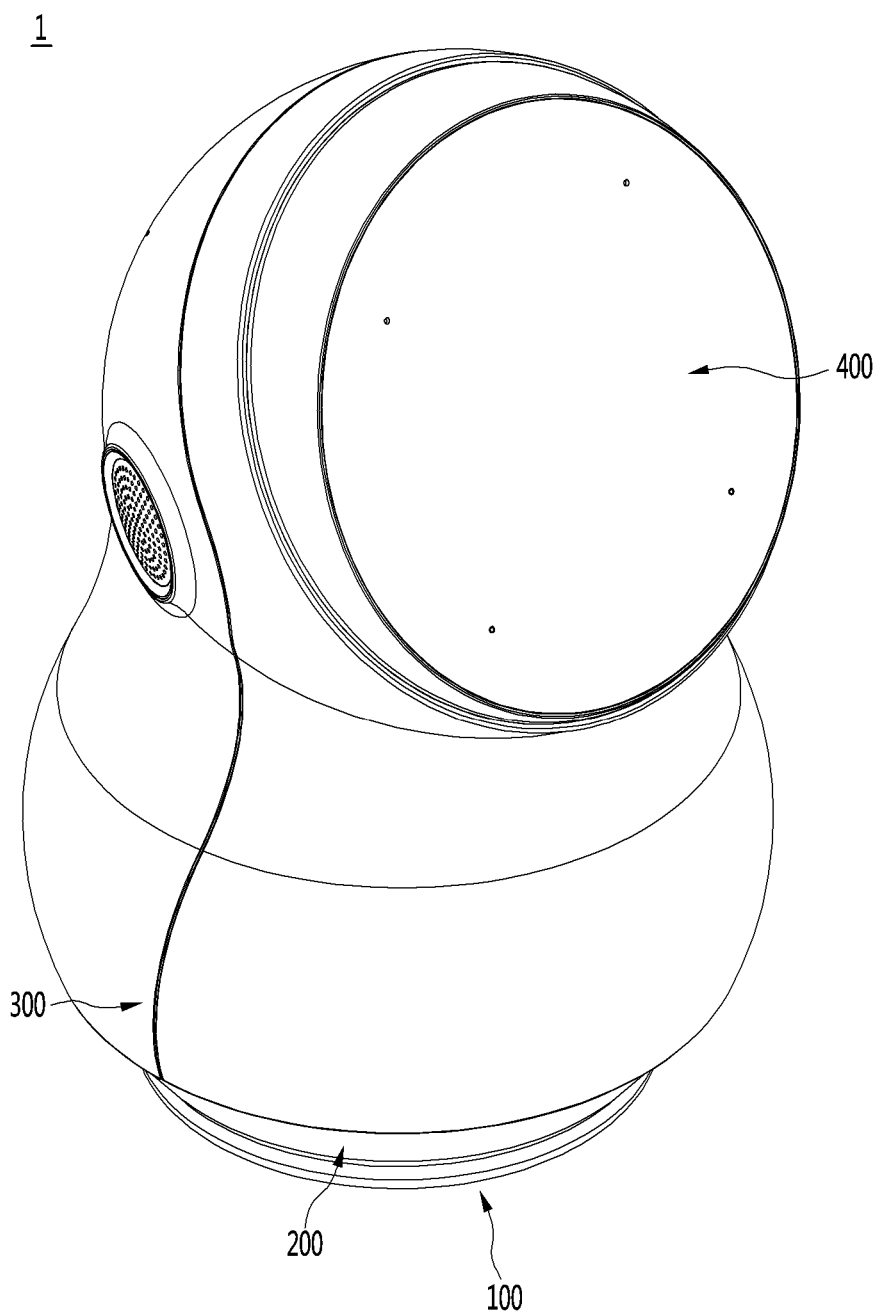
FIG. 2 is a perspective view of a robot according to an embodiment.
Figure 3:
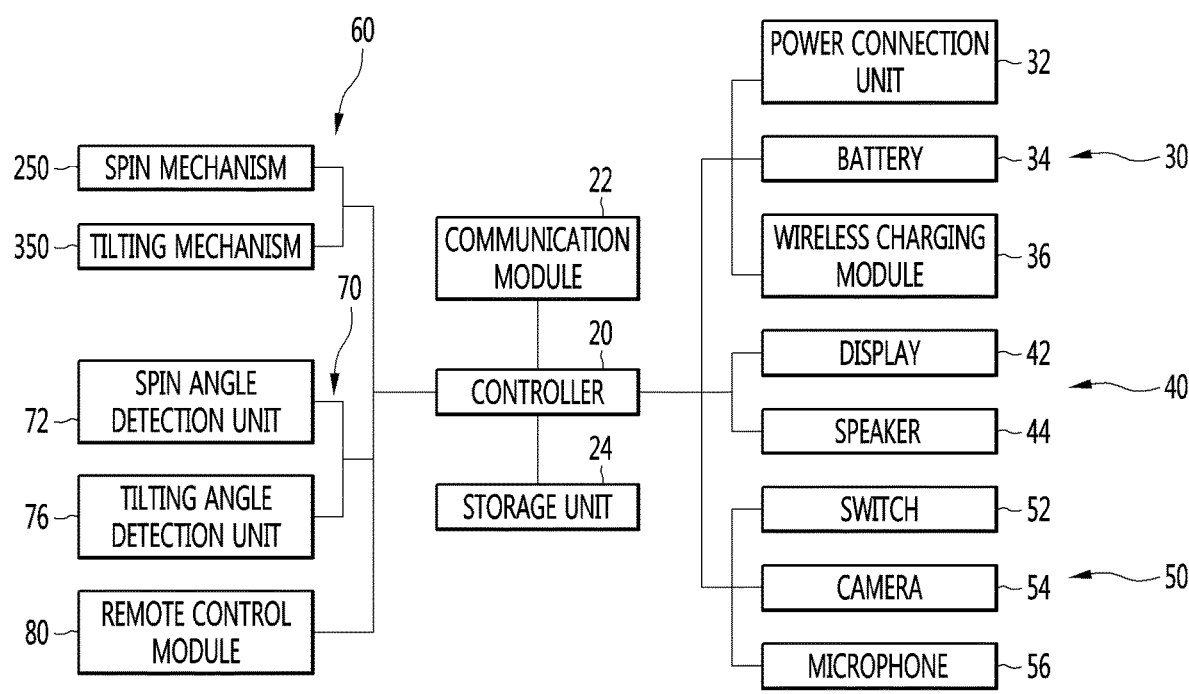
FIG. 3 is a control block diagram of the robot according to the embodiment.
Figure 4:
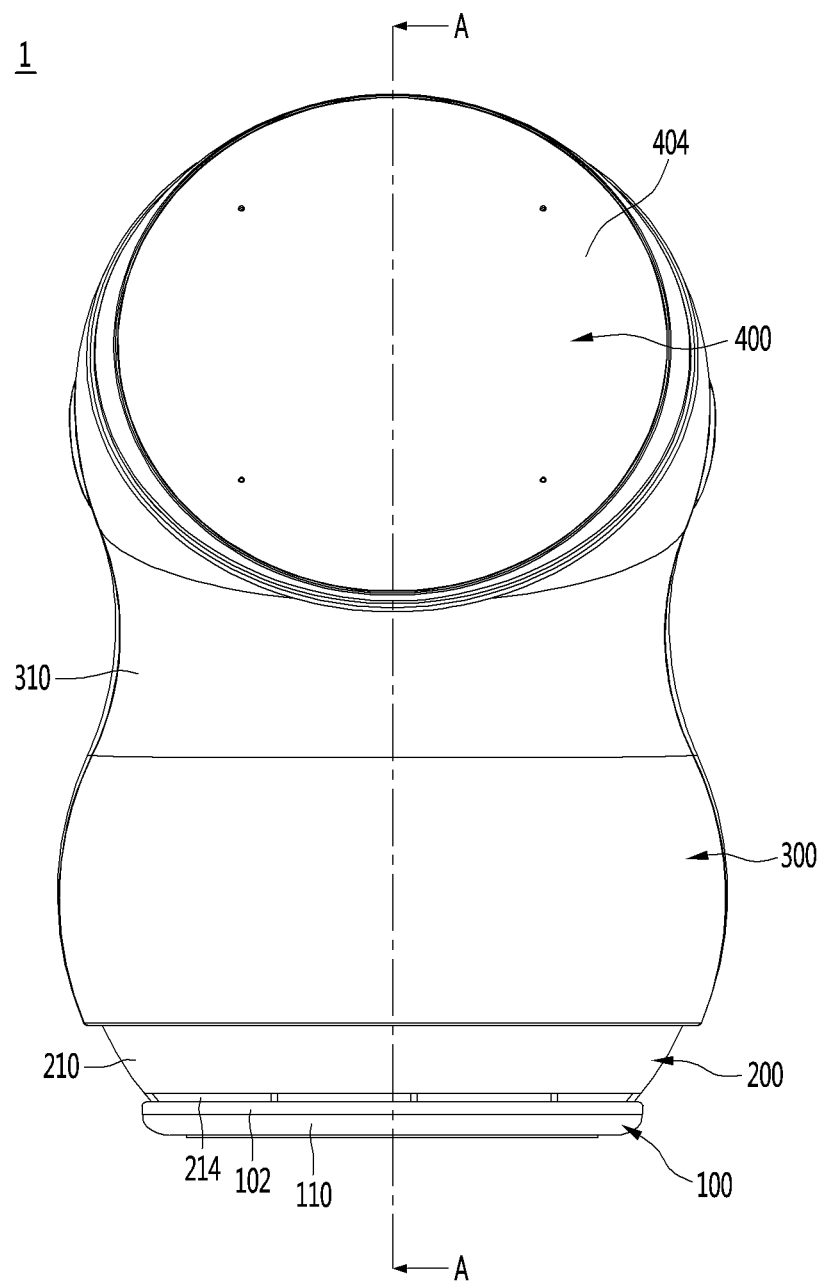
FIG. 4 is a front view of the robot according to the embodiment.
Figure 5:
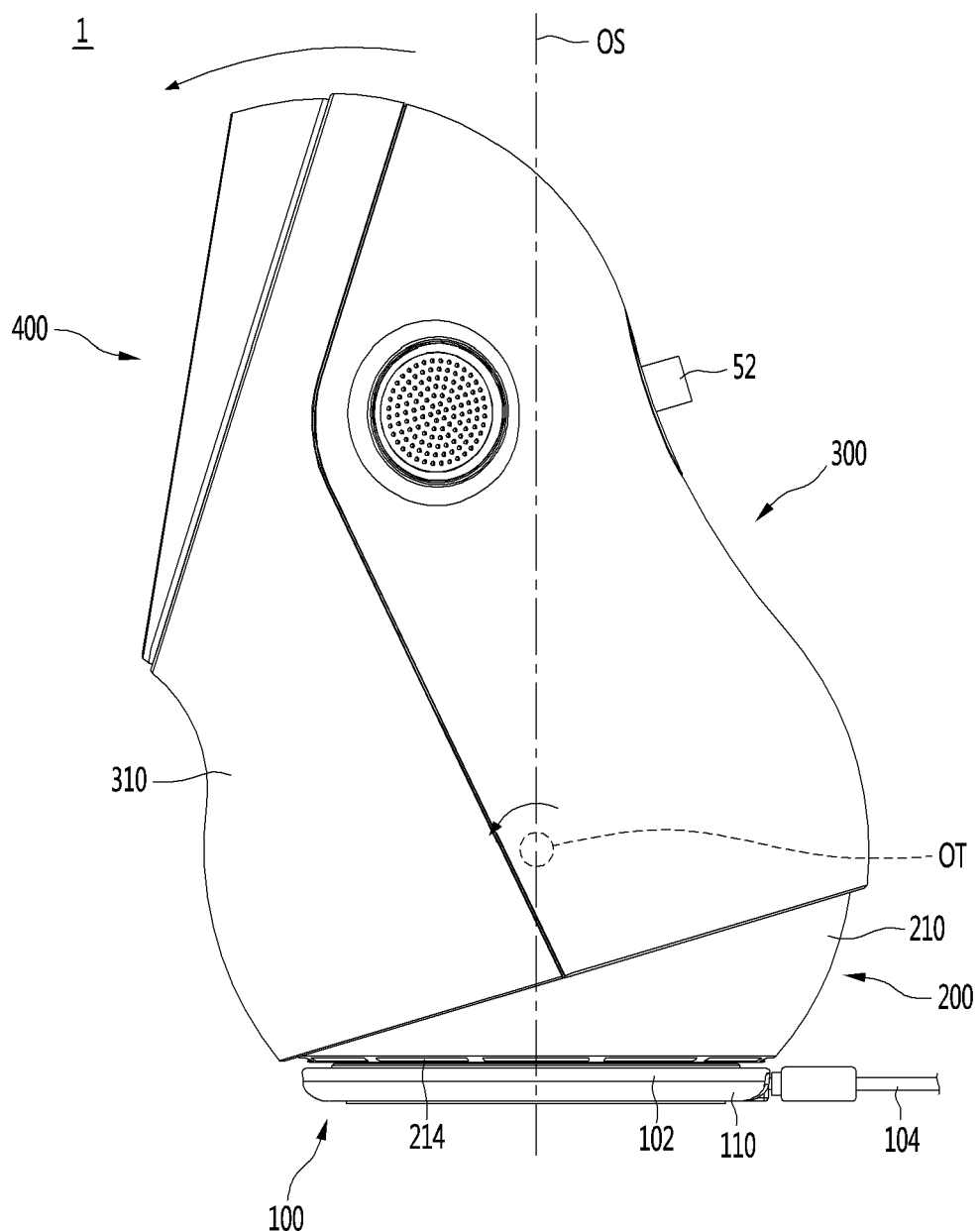
FIG. 5 is a side view illustrating a state in which a tilting body according to an embodiment is tilted forward.
Figure 6:
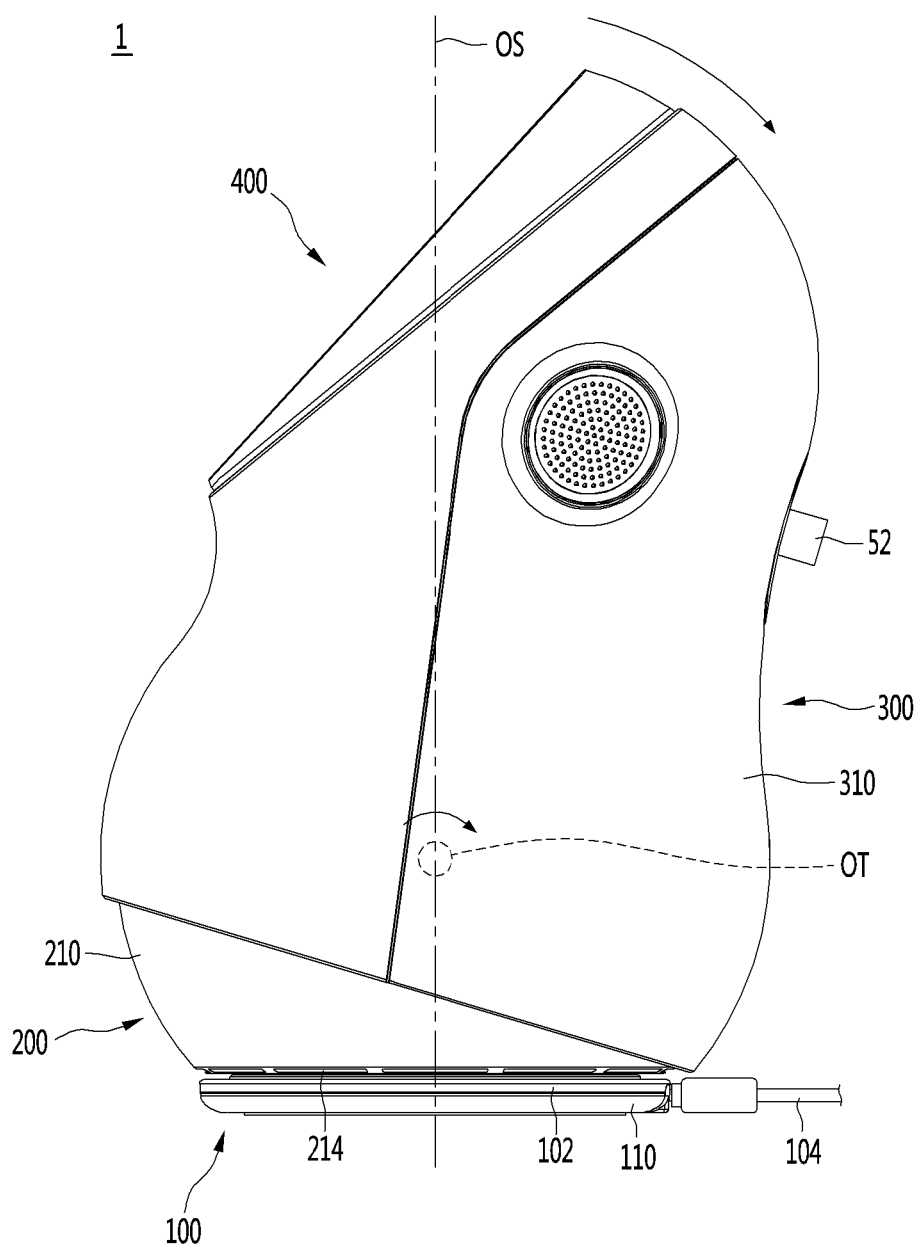
FIG. 6 is a side view illustrating a state in which the tilting body according to the embodiment is tilted rearward.

As illustrated in FIG. 1, a network system may include a robot (hub robot) 1 that transmits information via a wired network or a wireless network, accessories 2, 3*a*, and 3*b*, a gateway 4, a terminal 6, an access point 7, and a server 8. The network may be established based on technologies such as Wi-Fi, Ethernet, Zigbee, Z-wave, or Bluetooth.

The robot 1, the accessories 2, 3*a*, and 3*b*, the gateway 4, and the access point 7 may each include a communication module connectable to the network according to a predetermined communication protocol. A communication module included in each of the devices 1, 2, 3*a*, 3*b*, 4, and 7 constituting the network system may be determined according to the configuration of the network, and a plurality of communication modules may be provided in the device according to a communication method between each device and the network or between the devices.

The robot 1 may be connected to the access point 7 via a wired (e.g., Ethernet) or wireless (e.g., Wi-Fi) connection. Communication between the robot 1 and the accessories 2 and 3*b* may be achieved via the gateway 4 and the access point 7. As another example, communication between the robot 1 and the accessory 3*a* or between other devices 5 may be achieved via the access point 7.

A signal transmitted from the accessories 2 and 3*b* may be transmitted to the robot 1 via the gateway 4 and the access point 7 in sequence, and a signal transmitted from the robot 1 may be transmitted to the accessories 2 and 3*b* via the access point 7 and the gateway 4 in sequence. As another example, a signal transmitted from the accessory 3*a* or other device 5 may be transmitted to the robot 1 via the access point 7, and a signal transmitted from the robot 1 may be transmitted to the accessory 3*a* or other device 5 via the access point 7.

For example, information acquired by sensor modules of the accessories 2, 3*a*, and 3*b* may be transmitted to the server 8, the terminal 6, or the robot 1 via the network. In addition, a signal transmitted from the server 8, the robot 1, or the terminal 6 so as to control the sensor module, a control module, or a remote control module, for example, may be transmitted to the accessory 2. The transmission of such signals may be performed via the gateway 4 and/or the access point 7.

Communication between the accessories 2, 3*a*, and 3*b* and the robot 1 may be possible just by the gateway 4 and the access point 7. For example, even when a home network is disconnected from an external communication network such as the Internet, communication between the accessories 2, 3*a*, and 3*b* and the robot 1 may be possible. When the robot 1 is connected to the server 8 via the access point 7, information transmitted from the robot 1 or the accessory 2 may be stored in the server 8. The information stored in the server 8 may be received by the terminal 6 connected to the server 8.

The information transmitted from the terminal 6 may be transmitted to the robot 1 or the accessory 2 via the server 8. A smart phone may provide a convenient user interface (UI) based on graphics. The robot 1 and/or the accessory 2 may be controlled via the UI or the UI may be used to process and display information received from the robot 1 and/or the accessory 2. In addition, functions that can be implemented through the robot 1 and/or the accessory 2 may be extended by updating applications installed on the smart phone.

The terminal 6 and the robot 1 may directly communicate with each other regardless of the server 8. For example, the robot 1 and the terminal 6 may directly communicate with each other by using a Bluetooth scheme. The accessory 2 or display may be controlled and the information received from the accessory 2 with the robot 1 alone may be processed without using the terminal 6. The network system may be configured without the gateway 4, and the robot 1 may also function as the gateway 4.

The accessories 2, 3a, and 3b may include at least one communication module that allows a connection with the network. The communication module may communicate with a predetermined network. The accessories 2, 3a, and 3b may include a sensor module capable of detecting a predetermined surrounding environment. The accessories 2, 3a, and 3b may include a control module that performs a specific function that affects the surrounding environment. The accessories 2, 3a, and 3b may include a remote control module that transmits an optical signal (for example, an infrared signal) to control a predetermined peripheral device.

The accessories 2, 3a, and 3b with the sensor module may be devices including a pressure sensor, a humidity sensor, a temperature sensor, a radiation detection sensor, a heat detection sensor, a gas detection sensor, an air quality sensor, an electronic nose sensor, a healthcare sensor, a biometric sensor, a sleep sensor (for example, the sleep sensor may be attached to a user's pajamas or underwear to detect snoring, apnea, tossing, etc. while the user is sleeping), a proximity sensor, an illuminance sensor, an acceleration sensor, a magnetic sensor, a gravity sensor, a gyroscope sensor, a motion sensor, an RGB sensor, an infrared (IR) sensor, an ultrasonic sensor, a remote sensor, an SAR, a radar, and a light sensor (for example, a video sensor, an image sensor, etc.).

The accessories 2, 3a, and 3b with the control module may include smart lighting that controls illumination, a smart plug that controls application and degree of power, a smart temperature regulator that controls the operation and intensity of a boiler or an air conditioner, and a smart gas lock that controls a shutoff of gas. The accessories 2, 3a, and 3b with the remote control module may include an infrared LED or the like that emits an infrared (IR) signal to a remotely controllable household appliance or the like.

The accessories (for example, 3a and 3b) may perform a predetermined performance or operation. For example, the accessory 3a may be a video camera, and the accessory 3b may be a smart plug. The accessory 2 according to the embodiment may be installed at any position desired by the user. In addition, the accessory 2 may be utilized for various purposes. For example, the accessory 2 may be attached to an external object such as a household appliance, a door, a window, or a wall, for example.

The gateway 4 may mediate communication between one or more accessories 2 and 3b and the access point 7. The gateway 4 may communicate with the accessory 2 wirelessly. The gateway 4 may communicate with the access point 7 by wire or wirelessly. For example, the communication between the gateway 4 and the access point 7 may be based on Ethernet or Wi-Fi.

The access point 7 may be connected to the server 8 via wired or wireless communication. The server 8 may be connected via the Internet. The access point 7 may communicate with the server 8 through various terminals 6 connected to the Internet. The terminal 6 may be a mobile terminal such as a personal computer (PC) or a smart phone, for example.

The accessories 2 and 3b may communicate with the gateway 4. As another example, the accessory 3a may directly communicate with the access point 7 without passing through the gateway 4. The access point 7 may directly communicate with the accessory 3a or other device 5 equipped with the communication module without passing through the gateway 4. These devices 5 and 3a may include a Wi-Fi communication module so as to directly communicate with the access point 7 without passing through the gateway 4.

Referring to FIGS. 2-6, the robot may include a base 100, and a spin body (or first body) 200 rotated on the base 100. The robot may include a driving unit (or drive) 60 that controls a motion of the robot. The drive 60 may include a spin mechanism 250 to rotate the spin body 200.

The robot may further include a tilting body (or second body) 300 attached to the spin body 200. The drive 60 may further include a tilting mechanism 350 that controls a tilting of the tilting body 300. The robot may include at least one interface 42, 44, 54, and 56 installed in at least one of the spin body 200 or the tilting body 300.

The robot 1 may include a controller 20 configured to control the robot 1. The controller 20 may be provided in the server 8 or the terminal 6 so as to control the robot 1 through the network. The robot 1 may include a communication module 22 that communicates with the network. The communication module 22 may include a Wi-Fi module, a Bluetooth module, a Zigbee module, and a Z-wave module. The communication module 22 may be changed according to a communication scheme of a device with which the robot 1 is to be directly communicated.

The communication module 22 may communicate with at least one of the access point 7, the gateway 4, the accessories 2, 3a, and 3b, the server 8, or the terminal 6 constituting the network system. Information acquired from the input unit (or input) 50 through the communication module 22 may be transmitted over the network. Information may be received by the robot 1 on the network through the communication module 22, and the controller 20 may control an output unit (or output) 40 or the drive 60 based on the received information.

The robot 1 may further include a storage unit or memory 24 for storing information acquired through the driving detection unit 70. The memory 24 may store information received from the network through the communication module 22. The storage unit 24 may store commands input to the input 50.

The robot 1 may include a power supply device 30 configured to supply power to the respective components of the robot 1. The power supply device 30 may include a power connection unit 32 capable of connecting an external wired power cable. The power connection unit 32 may be a socket. The power supply device 30 may include a battery 34. The battery 34 may be rechargeable. The power supply device 30 may further include a charging module, for example, a wireless charging module 36, capable of charging the battery 34.

The robot 1 may include the output 40. The output 40 may output the information visually or audibly to the outside. The output 40 may include a display 42 that outputs information visually. The output 40 may include a speaker 44 that outputs information audibly.

The robot 1 may include the input 50. The input 50 may receive a command to control the robot 1. The input 50 may be configured to allow a user to directly input a command without passing through the communication module 22. The input 50 may receive a command to control the accessory 2.

The input 50 may include a switch 52. The switch 52 may include a power switch for turning on/off the power of the robot 1. The switch 52 may include a function switch for setting the function of the robot 1, pairing with a predetermined network, pairing with the terminal 6, and the like. It may be possible to set various commands to the robot 1 through a combination of the pressing time of the function switch and/or a number of times of continuously pressing the function switch. The switch 52 may include a reset switch capable of resetting a predetermined setting of the robot 1. The switch 52 may include a sleep switch for switching the robot 1 to a power-saving state or a non-output state.

The input 50 may include a sensor, for example, a camera 54, configured to sense an external visual image. The camera 54 may acquire an image of a user to recognize the user. The camera 54 may acquire an image that recognizes the direction of the user. Image information acquired by the camera 54 may be stored in the memory 24.

The input 50 may include a touch type display. The input 50 may include a microphone 56 that senses an external sound. When the robot 1 includes the microphone 56, the controller 20 of the robot 1 may recognize the user's voice input through the microphone 56 and extract a command. In order to recognize a position of a sound source, the input 50 may include a plurality of microphones 56. The sound information acquired by the microphone 56 or the position information about the user may be stored in the memory 24.

The robot 1 may include a direction sensor that senses the direction of the user with respect to the robot 1. The direction sensor may include the camera 54 and/or the plurality of microphones 56.

The robot 1 may give the same feeling as a living creature by performing the motion of the robot 1 together with the output contents of the display 42 of the robot 1 or the output contents of the speaker 44 of the robot 1. Just as gestures (motion) or eye contact play a big role in human-human communication, the motion of the robot 1 by the driving unit 60 may efficiently present the output contents of the output 40 to the user. The motion of the robot 1 by the driving unit 60 may add emotional elements in the communication process between the user and the robot 1.

The driving unit 60 may include a plurality of driving units 250 and 350. The plurality of driving units 250 and 350 may also include a spin mechanism 250 and a tilting mechanism 350. The plurality of driving units 250 and 350 may be independently driven, or may be simultaneously driven to enable complex motion.

The spin mechanism 250 may rotate the spin body 200 about the base 100. The spin mechanism 250 may provide power so as to rotate the spin body 200 about the rotational axis OS extending in the vertical direction with respect to the base 100. The tilting mechanism 350 may tilt the tilting body 300 about the tilting axis OT. The tilting mechanism 350 may provide power to the spin body 200 such that the tilting body 300 tilts to one side. The tilting mechanism 350 may be connected to the spin body 200. When the spin body 200 is rotated by the spin mechanism 250, the tilting mechanism 350 and the tilting body 300 may rotate together with the spin body 200.

The robot 1 may include a driving detection unit 70 capable of detecting a current motion state of the driving unit 60. The driving detection unit 70 may include a spin angle detection unit 72 that senses a rotating angle of the spin body 200 about the rotational axis OS. When the robot further includes the tilting body 300 and the tilting mechanism 350, the driving detection unit 70 may include a tilting angle detection unit 76 that detects a tilting angle of the tilting body 300 about the tilting axis OT with respect to the spin body 200.

The controller 20 may control the communication module 22 based on control information received from the input 50. The controller 20 may control the communication module 22 to store the information received from the network in the memory 24. The controller 20 may control the information stored in the memory 24 to be transmitted to the network via the communication module 22.

The controller 20 may receive information from the input 50. The controller 20 may control the output 40 to output predetermined information. The controller 20 may control the driving 60 to operate together with the information output by the output 40.

For example, the controller 20 may recognize the user based on the image acquired by the camera 54, and may operate the output 40 and the driving unit 60 based on the recognition result. When the recognized user matches a preset user, the controller 20 may display a smile image on the display 42 and operate the tilting mechanism 350 to tilt the tilting body 300 in the vertical or horizontal direction. As another example, the controller 20 may recognize the face position of the user based on the direction sensor, and may operate the output 40 and the driving unit 60 based on the recognition result.

The controller 20 may display predetermined information on the display 42 and operate the spin mechanism 250 such that the display 42 is directed toward the user's face. The controller 20 may control the spin body 200 to be rotated so as to switch the image output direction of the interface module 420 to the direction of the user detected by the direction sensor.

The controller 20 may control whether to operate the driving unit 60 based on the control information received from the network via the communication module 22. The controller 20 may control the driving unit 60 based on the control information received from the input 50. The controller 20 may control the driving unit 60 based on the control information stored in the memory 24.

The robot 1 may include a remote control module 80. The remote control module 80 may transmit an optical signal (for example, an infrared signal) to control a predetermined peripheral device. The predetermined peripheral device may be a peripheral device capable of remote control. For example, the predetermined peripheral device may be a washing machine, a refrigerator, an air conditioner, a robot cleaner, a TV, and the like, which may be controlled by a remote controller. The remote control module 80 may include a light emitting unit that emits a predetermined optical signal to control the predetermined peripheral device.

For example, the light emitting unit may be an LED that emits infrared rays. The direction in which the remote control module 80 irradiates the optical signal may be changed according to the operation of the robot 1. In this manner, the optical signal irradiation direction of the remote control module 80 may be changed in the direction of the specific device requiring the remote control, so as to control the specific device by the optical signal.

The display 42, the speaker 44, the camera 54, and the microphone 56, which may be included in the robot 1, may be interfaces to assist communication between a human and the robot 1. These interfaces may be mounted on the spin body 200 and may be rotatable together with the spin body 200 during the rotation of the spin body 200, and these interfaces may be mounted on the tilting body 300 and may be tilted together with the tilting body 300 during the tilting of the tilting body 300.

In the robot 1, the interfaces such as the display 42, the speaker 44, the camera 54, and the microphone 56, for example, may be distributed in the spin body 200 or the tilting body 300, or both the spin body 200 and the tilting body 300. The robot 1 may include an interface module 400 including at least one of the interfaces such as the display 42, the speaker 44, the camera 54, or the microphone 56, and the interface module 400 may be mounted on the tilting body 300, may spin together with the tilting body 300 during the rotation of the spin body 200, and may tilt together with the tilting body 300 during the tilting of the tilting body 300.

The battery 34, the display 42, the speaker 44, the camera 54, the microphone 56, the spin mechanism 250, the tilting mechanism 350, and the like may be supported on the spin body 200 or the tilting body 300 in consideration of the weights or sizes thereof, and may be arranged such that the entire center of gravity of the robot 1 is minimized.

Figure 7:
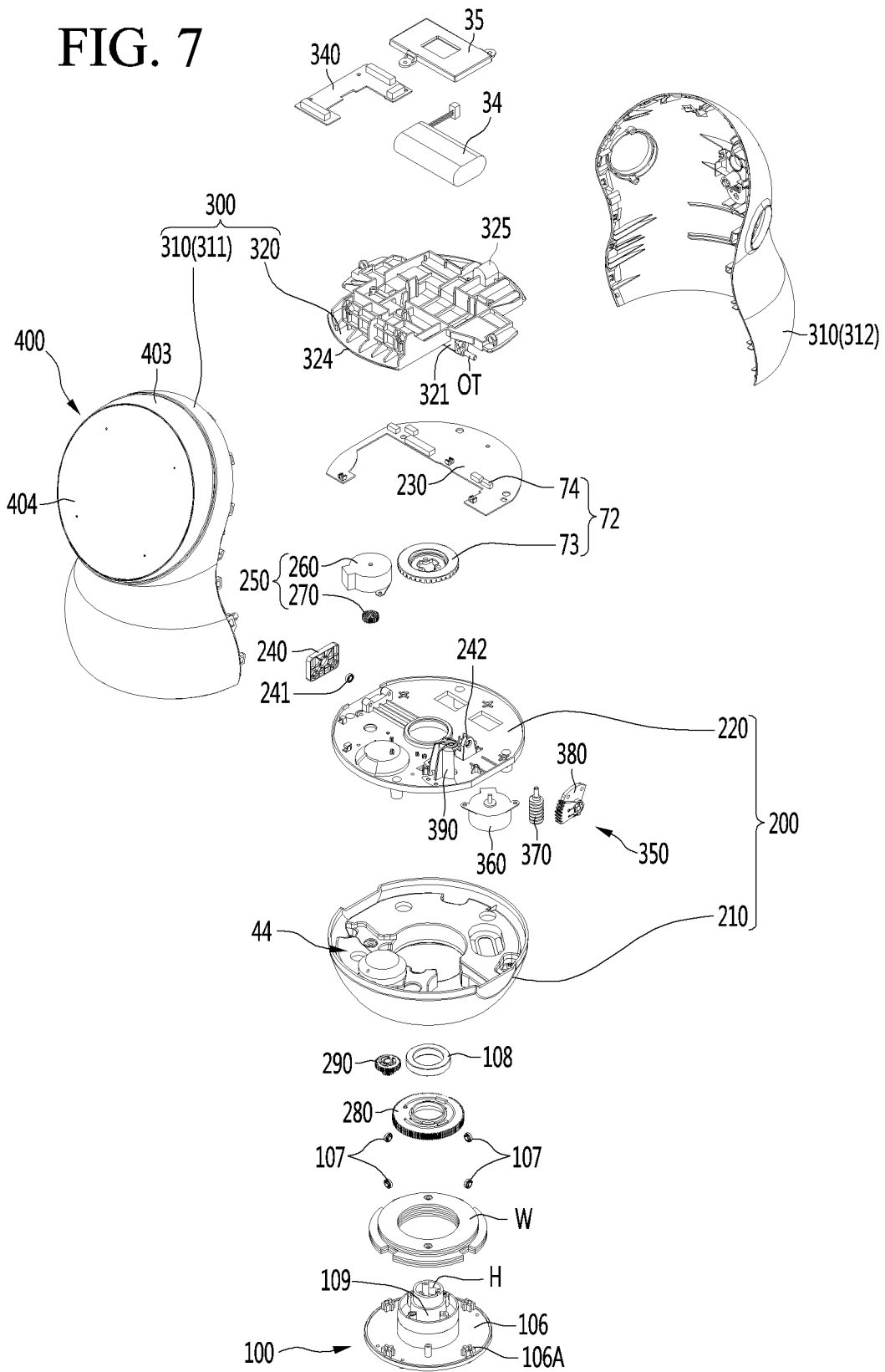
FIG. 7 is an exploded perspective view of the robot according to the embodiment.
Figure 8:
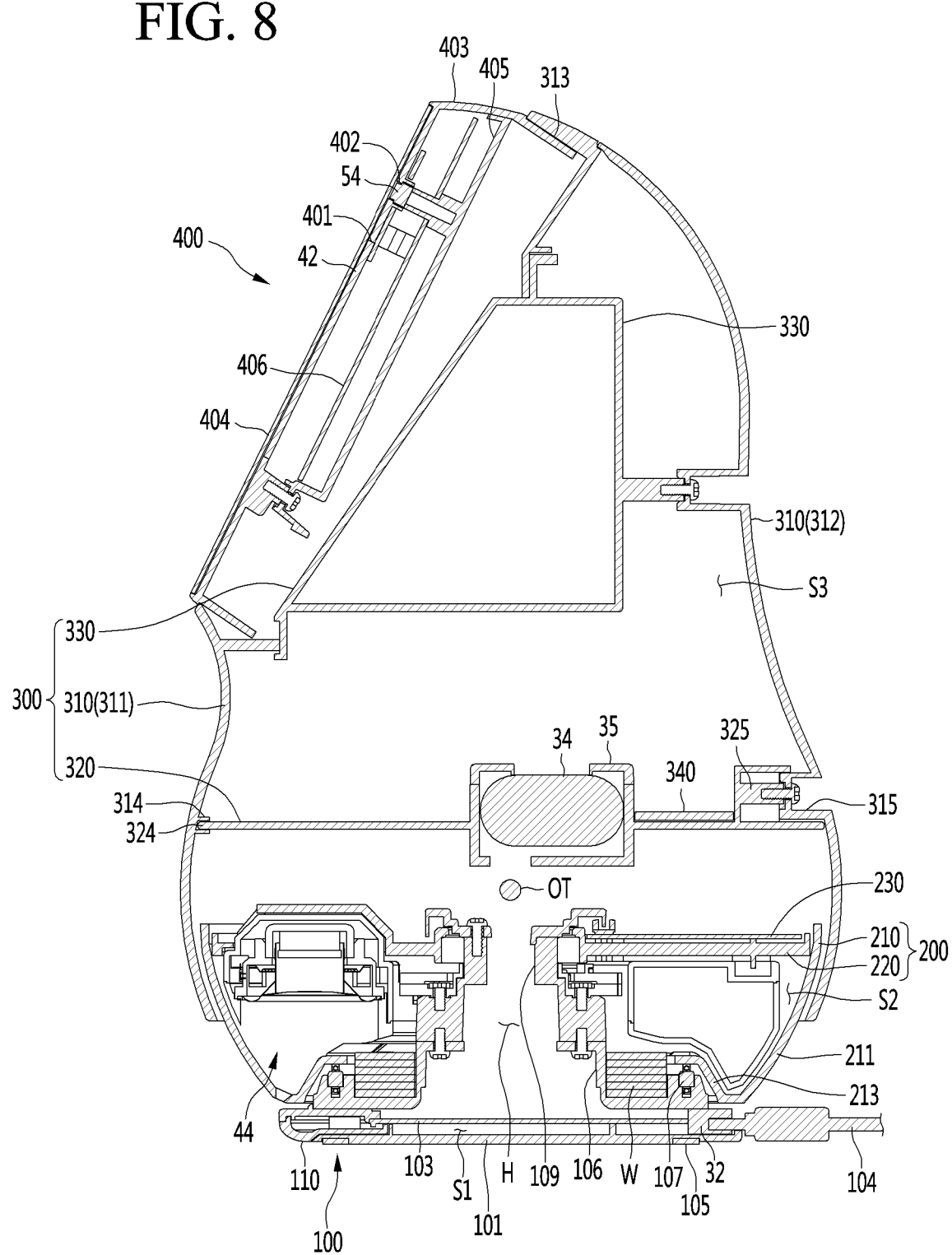
FIG. 8 is a cross-sectional view taken along line A-A' of FIG. 4.
Figure 9:
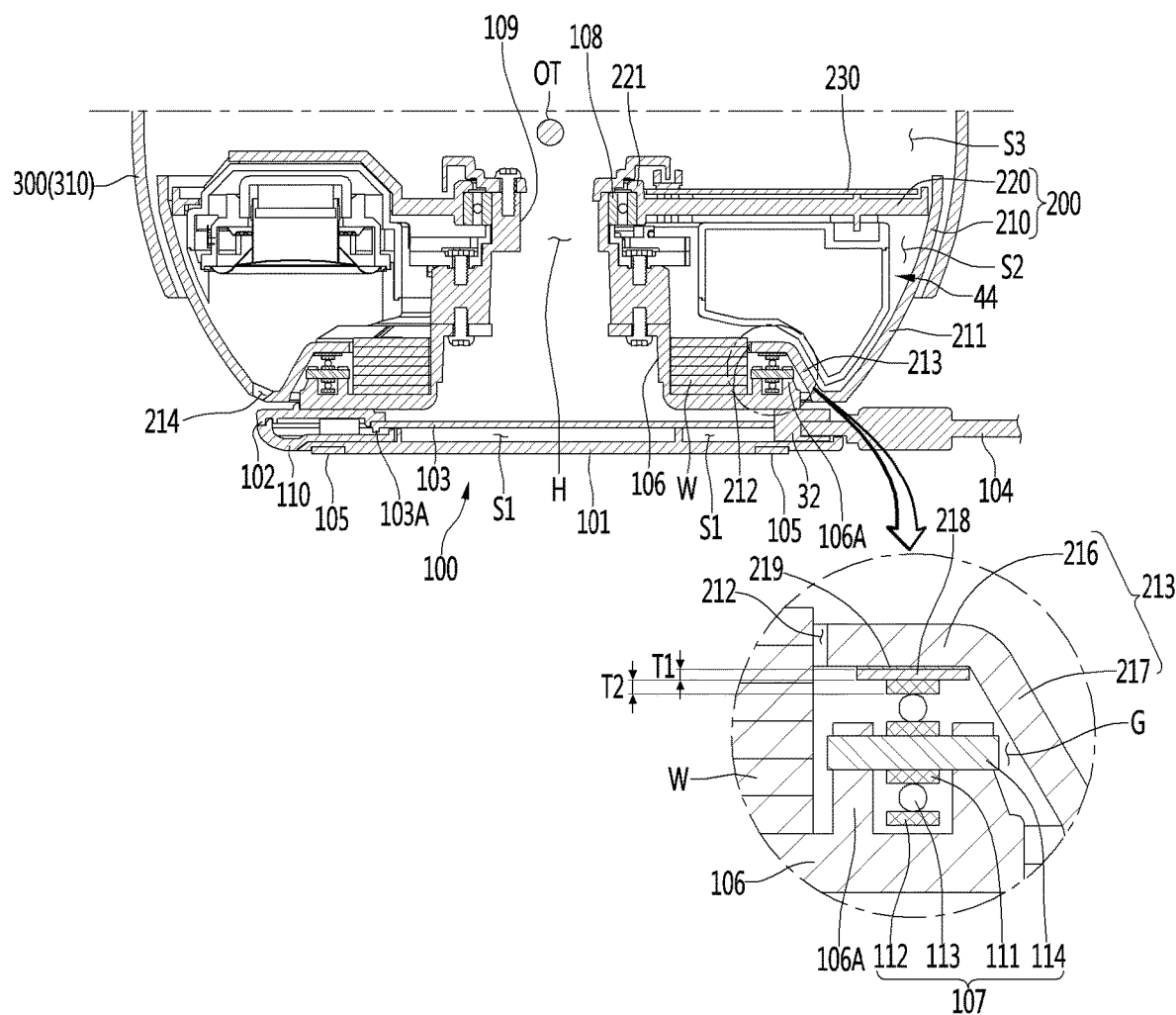
FIG. 9 is an enlarged cross-sectional view illustrating the inside of a base and a spin body according to an embodiment.

Referring to FIGS. 7-9, the base 100 may rotatably support the spin body 200 and may support the load of the spin body 200. When the robot further includes the tilting body 300 and the interfaces, the loads of the tilting body 300 and the interfaces may be transmitted to the base 100 through the spin body 200. Hereinafter, the base 100 will be described in detail with reference to FIGS. 7 to 9.

The base 100 may include a combination of a plurality of members. The base 100 may include a lower base 101, and an upper base 102 provided on the lower base 101. A PCB accommodation space S1 configured to accommodate a base PCB 103 may be formed in the base 100. The PCB accommodation space S1 may be formed between the lower base 101 and the upper base 102.

The base PCB 103 may be accommodated in the PCB accommodation space S1 formed in the base 100 and may be protected by the base 100. The base PCB 103 may be directly connected to the power connection unit 32 to which the power cord 104 is connected, or may be connected to the power connection unit 32 through a separate wire.

A light source 103A such as an LED may be provided on the base PCB 103. In this case, the base 100 may function as a lighting device, and the base 100 may provide visual information to the outside. The base 100 may further include a base decor member 110 through which light emitted from the light source 103A such as the LED is transmitted. The base decor member 110 may be arranged between the lower base 101 and the upper base 102, and light from the light source 103A such the LED may be emitted to the outside through the base decor member 110 between the lower base 101 and the upper base 102.

The base 100 may further include a non-slip member 105 provided on the bottom surface of the lower base 101. The non-slip member 105 may be formed in a ring shape or a disk shape, and may be attached to the bottom surface of the lower base 101. The non-slip member 105 may be a non-slip mat having a large frictional force with the ground.

The robot may include at least one rolling or roller bearing 107. The roller bearing 107 may be installed on the base 100 to support the spin body 200. The roller bearing 107 may have an inner ring or race 111 supported to the base 100, and an outer ring or race 112 that rotates around the inner ring 111. The roller bearing 107 may include a rolling member 113 such as a ball or a roller provided between the inner ring 111 and the outer ring 112. The inner ring 111 of the roller bearing 107 may be fixedly mounted on the base 100.

At least one of the roller bearing 107 or the base 100 may further include a rolling bearing support shaft 114 (hereinafter referred to as a supporting shaft) to which the inner ring 111 may be fixed. The support shaft 114 may be inserted into the inner ring 111 and may be fixed to the inner ring 111.

A bearing supporter 106 that supports the roller bearing 107 may be provided in the base 100. The support shaft 114 may be fixed to the bearing supporter 106, and the outer ring 112 may be rotated along the inner ring 111 outside the inner ring 111 in a state in which the roller bearing 107 is supported to the bearing supporter 106. During the rotation of the spin body 200, the outer ring 112 of the roller bearing 107 may facilitate the smooth rotation of the spin body 200 while rotating about the support shaft 114 disposed horizontally during the rotation of the spin body 200.

A plurality of roller bearings 107 may be provided in the base 100. The plurality of roller bearings 107 may support the spin body 200, particularly, the spin housing 210 in a state of being spaced apart from the base 100. The plurality of roller bearings 107 may be arranged along a virtual circle, and the plurality of roller bearings 107 may transmit the load acting on the spin body 200 to the base 100, particularly, the bearing supporter 106 in a distributed manner.

A weight body W capable of increasing the weight of the base 100 may be provided in the base 100. The weight body W may be a dense object, and may reduce the entire center of gravity of the robot 1 as much as possible and help the robot 1 not to overturn. The weight body W may be provided in the bearing supporter 106. The weight body W may be provided on the top surface of the bearing supporter 106. A plurality of weight bodies W may be stacked in the vertical direction.

An upper bearing 108 that rotatably supports the spin body 200 may be provided in the base 100. The base 100 may further include a fixed shaft 109 on which the upper bearing 108 is mounted. A central axis of the fixed shaft 109 may be the center of rotation of the spin body 200, and the central axis of the fixed shaft 109 may be the rotational axis OS. The fixed shaft 109 may be arranged on the top side of the bearing supporter 106. The fixed shaft 109 may be coupled to the bearing supporter 106 by a fastening member such as a screw.

The upper bearing 108 may be mounted on the fixed shaft 109 above a spin driven gear 280 to be described later. The upper bearing 108 may surround the outer circumference of the upper portion of the fixed shaft 109. The upper bearing 108 may be an upper rolling or roller bearing provided between the fixed shaft 109 and a spin cover 220 to be described later.

The upper bearing 108 may include an inner ring or race fixed to the outer circumference of the fixed shaft 109, an outer ring or race fixed to the upper bearing housing 221 formed in the spin cover 220, and a rolling member such as a ball or a roller disposed between the inner ring and the outer ring. The upper bearing 108 may be provided above the spin driven gear 280 and spaced apart from the spin driven gear 280, and may rotatably support the spin cover 220. The shaft center of the upper bearing 108 may be a vertical axis, and the shaft center of the upper bearing 108 may coincide with the rotational shaft OS.

The spin driven gear 280 may be mounted on the fixed shaft 109, and the spin driven gear 280 may be mounted to the fixed shaft 109 by a fastening member such as a screw. The spin driven gear 280 may have a double structure of an upper gear and a lower gear, and the upper gear and the lower gear may be fixed to each other. The spin driven gear 280 may rotate the spin body 200 while being fixedly mounted on the fixed shaft 109. The spin body 200 may be rotated along the locus of the spin driven gear 280.

A through-hole (H) through which a wire may pass may be formed in the fixed shaft 109. The through-hole H may pass through the fixed shaft 109 in the vertical direction. The wire or the like passing through the through-hole H of the fixed shaft 109 may connect the base PCB 103 to a PCB 230 mounted on the spin body 200, a PCB 340 mounted on the tilting body 300, and an interface PCB 406 of the interface module 400.

Hereinafter, the spin body 200 will be described. The spin body 200 may be supported so as to spin above the base 100, and the rolling bearing 107 and the spacer 218 may support the spin body 200 so as to minimize the wear of the spin body 200.

The spacer 218 may separate the spin body 200 from the roller bearing 107, and may be provided between the spin body 200 and the roller bearing 107. To this end, the spacer 218 may be attached to the spin body 200. The spacer 218 may be attached to a portion of the spin body 200 facing the outer surface of the roller bearing 107. The spacer 218 may contact the roller bearing 107 instead of the spin body 200. The spacer 218 may be made of a synthetic resin material having higher abrasion resistance than the spin body 200 and may include a film or a sheet.

The outer ring 112 of the roller bearing 107 may be in contact with the spacer 218, and may not be in direct contact with the spin body 200. The surface hardness of the spacer 218 may be higher than the surface hardness of the spin body 200. The spacer 218 may be configured such that the outer ring 112 is not worn, and the surface hardness of the spacer 218 may be lower than the surface hardness of the outer ring 112.

The outer ring 112 may be made of a metal material such as SUS or steel. In this case, the spacer 218 may be a polyethylene (PE) plastic material, and the base 100 may be an acrylonitrile butadiene styrene (ABS) plastic material. Among the plurality of members constituting the base 100, a member close to the roller bearing 107 may be an ABS material. A member to which the spacer 218 is attached, for example, the spin housing 210 to be described later may be an ABS material.

The spacer 218 may have a flat shape, and the upper surface and the lower surface of the spacer 218 may each have a flat annular shape. The lower surface of the spacer 218 may be an outer ring contact surface seated on the outer ring 112. The upper surface of the spacer 218 may be a spin body attachment surface that may be attached to the spin body 200 by an adhesive member 219 such as a double-sided tape or an adhesive. The attachment of the spacer 218 and the spin body 200 may be defined as an attachment through the adhesive member 219 arranged between the spacer 218 and the spin body 200. A thickness T1 of the spacer 218 may be less than a thickness T2 of the outer ring 112.

The spin body 200 may be formed in a shape that may protect the spacer 218 and the rolling bearing 107 and may minimize introduction of foreign matters such as dust into the spacer 218 and the rolling bearing 107. The spin body 200 may be three-dimensional in shape as a whole, and may include a first body or section 216 and a second body or section 217. The spacer 218 may be attached to the bottom surface of the first body 216.

The second body 217 may extend from the first body 216. The second body 217 may surround the gap T between the base 100 and the first body 216 and the outer circumference of the spacer 218. The first body 216 may have an annular shape. The first body 216 may have the same area as that of the spacer 218, or may have an area slightly larger than that of the spacer 218.

The second body 217 may extend from the outer circumference of the first body 216, and may have a hollow cylindrical shape that gradually enlarges toward the lower side. The second body 217 may include an inner circumferential surface that may face the outer circumference of the spacer 218 in the horizontal direction and may be directed between the bottom surface of the spacer 218 and the top surface of the bearing supporter 106 in the horizontal direction.

The first body 216 and the second body 217 may function as a cover member (or a hiding member) allowing the spacer 218 and the roller bearing 107 to be invisible from the outside of the spin body 200. The spin body 200 may further include a third body or section 211 extending from the second body 217 and surrounding the outer circumference of the second body 217. The third body 211 may extend from the lower portion of the second body 217, and may have a hollow cylindrical shape that gradually expands toward the upper side.

The spin body 200 may include a combination of a plurality of members, and the spin body 200 may include a spin housing 210 having a space S2 formed therein and a spin cover 220 that covers the space S2. The interface according to the present embodiment may be accommodated in the space S2 of the spin body 200. The interface accommodated in the space S2 of the spin body 200 may be relatively large and relatively heavy as compared with the other interfaces 42, 54, and 56, and the speaker 44 may be accommodated in the space S2 of the spin body 200. However, embodiments are not limited to the case where the speaker 44 is accommodated in the space S2 of the spin body 200, and other interfaces such as the microphone 56, the battery 34, or the PCB 230 may be accommodated in the space S2 of the housing 210.

The interface accommodated in the space S2 of the spin body 200 may be provided below the spin cover 220, and may be protected by the spin cover 220. The space S2 formed in the spin body 200 may be a space in which the interface (for example, the speaker 44) may be accommodated, and the spin housing 210 and the spin cover 220 may function as a protective cover to protect the interface accommodated in the space S2.

Part of the spin housing 210 may be exposed to the outside. Part of the spin housing 210 may be seen through the lower end of the tilting housing 310, and the spin housing 210 may constitute part of the appearance of the robot. The spin housing 210 may have a shape in which the top surface thereof is opened and the diameter thereof is reduced downward. The outer surface of the spin housing 210 may be convex toward the outside.

The first body 216, the second body 217, and the third body 211 may constitute the spin housing 210. The spin housing 210 may include an outer hollow body 211 and an inner hollow body 213. The outer hollow body 211 may have a space S2 in which the speaker 44 may be accommodated, and the size of the outer hollow body 211 may be reduced toward the lower side. The outer hollow body 211 may have the same configuration as that of the third body 211 extending from the second body 217.

The inner hollow body 213 may extend from the lower end of the outer hollow body 211 toward the space S2 formed inside the outer hollow body 211. The first body 216 and the second body 217 may constitute the inner hollow body 213. A base through-hole (212, see FIG. 9) through which part of the base 100 passes may be formed at the center of the inner hollow body 213.

The base through-hole 212 may be formed in the inner hollow body 213 in a hollow shape, and the inner hollow body 213 may be rotated along the plurality of rolling bearings 107 when the bottom surface of the spacer 218 is in contact with the outer ring 112 of the rolling bearing 107. The speaker 44 accommodated in the space S2 of the spin body 200 may include a sound module or actuator and at least one sound box connected to the sound module.

The spin body 200, particularly, the spin housing 210 may include an acoustic hole 214 that allows the sound generated from the speaker 44 to pass through the spin body 200. A plurality of acoustic holes 214 may be formed in the spin housing 210, and the plurality of acoustic holes 214 may be spaced from each other in the circumferential direction of the spin housing 210. The spin housing 210 may include a plurality of bridges 215 connecting the outer hollow body 211 and the inner hollow body 213, and the acoustic holes 214 may be formed between the bridges adjacent in the circumferential direction.

The spin cover 220 may have a plate shape as a whole, or may be mounted on the top end of the spin housing 210. The spin cover 220 may be inserted into the spin housing 210 and coupled to the spin housing 210 inside the spin housing 210.

Tilting shaft supporters 240 and 242 (FIG. 7) that rotatably support the tilting shaft OT may be provided on the spin cover 220. The tilting shaft supporters 240 and 242 may be provided on the top surface of the spin cover 220. The pair of tilting shaft supporters 240 and 242 may be spaced apart in the horizontal direction, and the tilting shaft OT may be rotatably supported on the tilting shaft supporters 240 and 242 through the bearing 241.

The robot may further include the PCB 230 (see FIGS. 7 and 8) provided on the top surface of the spin cover 220. The PCB 230 may be smaller than the spin cover 220 and may cover part of the top surface of the spin cover 220. The PCB 230 may be horizontally arranged on the top surface of the spin cover 220. The PCB 230 may control at least one electrical component mounted on the spin cover 220. For example, the PCB 230 may be a motor control PCB for controlling the spin motor 260 and the tilting motor 360.

The spin mechanism 250 may be connected to the spin body 200 and may rotate the spin body 200. The spin mechanism 250 may include a spin motor 260, a spin driving gear 270, and a spin driven gear 280. The spin motor 260 may be provided in the spin cover 220, and the driving shaft may protrude from the lower portion of the spin motor 260.

The spin motor 260 may be provided on the top surface of the spin cover 220. The spin motor 260 may be fastened to the spin cover 220 by a fastening member such as a screw. The driving shaft of the spin motor 260 may be vertically oriented below the spin motor 260. The driving shaft of the spin motor 260 may protrude toward the space S2.

The spin cover 220 may include a vertical through-hole through which at least one of the driving shaft of the spin motor 260 or the spin driving gear 270 passes. At least one of the driving shaft of the spin motor 260 or the rotational shaft of the spin driving gear 270 may be provided in the through-hole of the spin cover 220.

The spin driving gear 270 may be engaged with the driving shaft of the spin motor 260 in the space S2. The spin driving gear 270 may be rotated inside the spin body 200 and may be protected by the spin body 200. The spin driving gear 270 may be suspended from the driving shaft of the spin motor 260. The spin driving gear 270 may be rotated by the spin motor 260 below the bottom surface of the spin cover 220.

The spin driven gear 280 may be fixed to the base 100. The spin driven gear 280 may be a fixed gear that is fixedly mounted to the fixed shaft 109 of the base 100. In the spin mechanism 250, the spin driving gear 270 may be engaged with the spin driven gear 280. In this case, the spin driving gear 270 may be rotated while revolving along the outer circumference of the spin driven gear 280.

In the spin mechanism 250, the spin driving gear 270 may not be directly engaged with the spin driven gear 280, and the spin driving gear 270 and the spin driven gear 280 may be connected via a spin intermediate gear 290 (see FIG. 7). The spin intermediate gear 290 may be rotatably connected to the spin cover 220. The spin cover 220 may include an intermediate gear support shaft that rotatably supports the spin intermediate gear 290.

The intermediate gear support shaft may protrude downward from the bottom surface of the spin cover 220. The spin intermediate gear 290 may be accommodated in the space S2 of the spin body 200 like the spin driving gear 270. The spin intermediate gear 290 may transmit power between the spin driving gear 270 and the spin driven gear 280. The spin intermediate gear 290 may revolve along the outer circumference of the spin driven gear 280.

The tilting body 300 may include a tilting housing 310 and a tilting base 320. The tilting housing 310 may form the appearance of the robot and may be larger than the spin housing 210. The bottom surface of the tilting housing 310 may be opened. An upper space S3 may be formed inside the tilting housing 310. The upper space S3 may be a space in which the tilting base 320 is accommodated.

The tilting housing 310 may include a combination of a plurality of members, and a plurality of housings that are disposed in a longitudinal or vertical direction may be coupled to each other. The tilting housing 310 may include a first tilting housing 311 on which an interface module 400 to be described later is mounted, and a second tilting housing 312 coupled to the first tilting housing 311, and the upper space S3 may be formed between the first tilting housing 311 and the second tilting housing 312.

When the first tilting housing 311 is a front tilting housing, the second tilting housing 312 may be a rear tilting housing coupled to the rear end of the first tilting housing 311. When the first tilting housing 311 is a left tilting housing, the second tilting housing 312 may be a right tilting housing coupled to the right end of the first tilting housing 311.

The tilting housing 310 may include an opening 313 (see FIG. 8) on which the interface module 400 is mounted. The interface module 400 may be inserted into the opening 313 and disposed in the opening 313. The opening 313 of the tilting housing 310 may be formed in the first tilting housing 311. In this case, the first tilting housing 311 may be a front housing facing the human so as to communicate with the human.

The tilting base 320 may be protected by the tilting housing 310 in a state of being accommodated in the upper space S3 of the tilting housing 310. The tilting base 320 may be connected to the tilting shaft OT and rotated together with the tilting shaft OT. A tilting shaft connecting portion 321 (see FIG. 7), to which the tilting shaft OT is connected, may be formed in the tilting base 320. The tilting shaft connecting portion 321 may be elongated at the lower portion of the tilting base 320 in the horizontal direction.

The tilting shaft OT may be elongated in the tilting base 320 in the horizontal direction. The tilting shaft OT may be connected to the tilting base 320, and the tilting base 320 may be coupled to the tilting housing 310. During the rotation of the tilting shaft OT, the tilting base 320 and the tilting housing 310 may tilt while rotating together about the tilting shaft OT. The tilting housing 310 may tilt about the tilting shaft OT while rotating together with the tilting base 320 during the rotation of the tilting base 320.

The tilting base connecting portion or groove 314 (see FIG. 8), to which the tilting base 320 is coupled, may be formed on the inner surface of the tilting housing 310. The connecting portion 324 (see FIG. 8), into which the tilting base connecting portion 314 is inserted and fitted, may be formed in the tilting base 320. The tilting base connecting portion 314 may include a pair of ribs spaced apart from each other by an interval corresponding to the thickness of the connecting portion 324 such that the connecting portion 324 is inserted and fitted thereinto.

The connecting portion 324 may be formed at part of the outer circumference of the tilting base 320 and may be inserted between one pair of ribs. The tilting housing 310 may be provided with a tilting base mounter 315 (see FIG. 8) fastened to the tilting base 320 by a fastening member such as a screw. The tilting base 320 may be provided with a fastening portion 325 (see FIG. 8) fastened to the tilting base mounter 315 by a fastening member such as a screw.

The tilting base mounter 315 may protrude from the tilting housing 310 toward the upper space S3. The fastening portion 325 may include a fastening boss to which the fastening member such as the screw may be fastened. The fastening portion 325 may be formed on an opposite side of the tilting base 320 to the connecting portion 324.

The tilting base 320 may be arranged across the upper space S3 formed inside the tilting housing 310. The tilting base connecting portion 314 and the tilting base mounter 315 may be formed on the inner lower portion of the tilting housing 310. In this case, the tilting base 320 may be arranged across the inner lower portion of the tilting housing 310, and the lower strength of the tilting housing 310 may be reinforced.

In the robot, the battery 34 may be mounted on at least one of the base 100, the spin body 200, the tilting body 300, or the interface module 400. The battery 34 may be mounted in a configuration that is relatively low in height among the configurations of the robot and may be provided on the rotational axis OS. To this end, the battery 34 may be provided on the tilting base 320. The tilting base 320 may include a pocket into which the battery 34 is inserted and accommodated. The battery cover 35 (see FIG. 8) may be coupled to the tilting base 320 so as to prevent the battery 34 accommodated in the pocket from being removed.

The tilting body 300 may further include a tilting supporter 330 that supports the tilting housing 310. The tilting supporter 330 may reinforce the strength of the tilting housing 310. The strength of the tilting housing 310 may be reinforced by connecting weak portions of the tilting housing 310 to each other. The strength of the tilting housing 310 around the opening 313 may be relatively weak and the tilting supporter 330 may connect the periphery of the opening 313.

When the opening 313 is formed in the first tilting housing 311, the tilting supporter 330 may connect the upper periphery of the opening 313 and the lower periphery of the opening 313 in the first tilting housing 311. The tilting supporter 330 may be connected to the upper portion of the second tilting housing 312.

The tilting supporter 330 may have a frame shape, and may be arranged in the upper space S3 of the tilting housing 310 to function as a frame to support the tilting housing 310. The tilting supporter 330 may be provided on the tilting base 320. The tilting base 320 may be a lower reinforcing member that reinforces the lower strength of the tilting housing 310, and the tilting supporter 330 may be an upper reinforcing member that reinforces the upper strength of the tilting housing 310. The lower portion of the tilting housing 310 may surround the outer circumferential surface of the spin housing 210.

The tilting mechanism 350 may include a tilting motor 360, a tilting driving gear 370 elongated in a direction intersecting with the tilting shaft OT and connected to the tilting motor 360, and a tilting driven gear 380 connected to the tilting shaft OT or the tilting body 300 and engaged with the tilting driving gear 370. The tilting motor 360 may be provided below the spin cover 220 while being accommodated in the space S2. The tilting driven gear 380 may be arranged above the spin cover 220. The tilting motor 360 and the tilting driven gear 380 may be connected through the tilting driving gear 370 in a state of having the spin cover 220 interposed therebetween.

A through-hole through which at least one of the driving shaft of the tilting motor 360 or the tilting driving gear 370 passes may be formed in the spin cover 220 in the vertical direction. At least one of the driving shaft of the tilting motor 360 or the rotational shaft of the tilting driving gear 370 may be provided in the through-hole of the spin cover 220.

The spin cover 220 may include a tilting motor fastening portion to which the tilting motor 360 is fastened. The tilting motor 360 may be fastened to the tilting motor fastening portion provided below the spin cover 220. The tilting motor 360 may be fastened to the spin cover by a fastening member such as a screw. The tilting motor fastening portion may be a fastening boss or a fastening hole formed in the spin cover 220.

The driving shaft of the tilting motor 360 may be oriented in a direction intersecting with or perpendicular to the tilting shaft OT. The tilting shaft OT may extend in the horizontal direction and the tilting motor 360 may be mounted on the spin cover 220 with the driving shaft extending in the vertical direction.

The tilting driving gear 370 may be rotated by the tilting motor 360. The tilting driving gear 370 may be a worm gear oriented vertically. The worm gear that is the tilting driving gear 370 may be vertically oriented on the spin cover 220 in a state of being connected to the tilting motor 360. The tilting driven gear 380 may be a spur gear that rotates about the tilting shaft OT. The tilting driven gear 380 may be connected to at least one of the tilting shaft OT or the tilting base 320 so as to rotate the tilting body 300.

The tilting driven gear 380 may be connected to the tilting body 300, particularly, the tilting base 320, so as to rotate the tilting base 320 about the tilting shaft OT. The tilting driven gear 380 may include a tilting base fastening portion that may be fastened to the tilting base 320 by a fastening member such as a screw. The robot may further include a gear supporter 390 mounted on the spin cover 220 and supporting the tilting driving gear 370.

The spin cover 220 may include a gear supporter fastening portion to which the gear supporter 390 is fastened. The gear supporter 390 may be fastened to the spin cover 220 by a fastening member such as a screw, and the gear supporter fastening portion may be a fastening boss or a fastening hole formed in the spin cover 220.

The display 42, the camera 54, and the microphone 56 may be mounted on the tilting body 300 and rotated together with the tilting body 300 during the rotation of the spin body 200, and may be tilted together with the tilting body 300 during the tilting of the tilting body 300. The interface module 400 may include interfaces other than the interfaces accommodated in the space S2, and at least one interface constituting the interface module 400 may be the display 42, the camera 54, the microphone 56, and the like.

Referring to FIG. 8, the interface module 400 may include an interface case 403 mounted on the tilting body 300 and having openings 401 and 402 formed therein, a front cover 404 provided on the front surface of the interface case 403 and covering the openings 401 and 402, and a back cover 405 coupled to the interface case 403. The back surface of the interface case 403 may be opened, and the openings 401 and 402 may be formed on the front surface of the interface case 403. The front cover 404 may cover the front surface of the interface case 403.

The back cover 405 may be provided inside the interface case 403 and may be fastened to the interface case 403 by a fastening member such as a screw. The interface module 400 may further include an interface PCB 406 provided in the back cover 405. The display 42 constituting the interface of the present disclosure may be provided between the interface PCB 406 and the front cover 404 to constitute the interface module 400. All or part of the display 42 may be accommodated in one opening 401 among the openings 401 and 402 and may output an image through the front cover 404.

The camera 54 constituting the interface of the present disclosure may be arranged between the back cover 406 and the front cover 404. All or part of the camera 54 may be accommodated in the other opening 402 among the openings 401 and 402 and may capture an image through the front cover 404.

Figure 10:
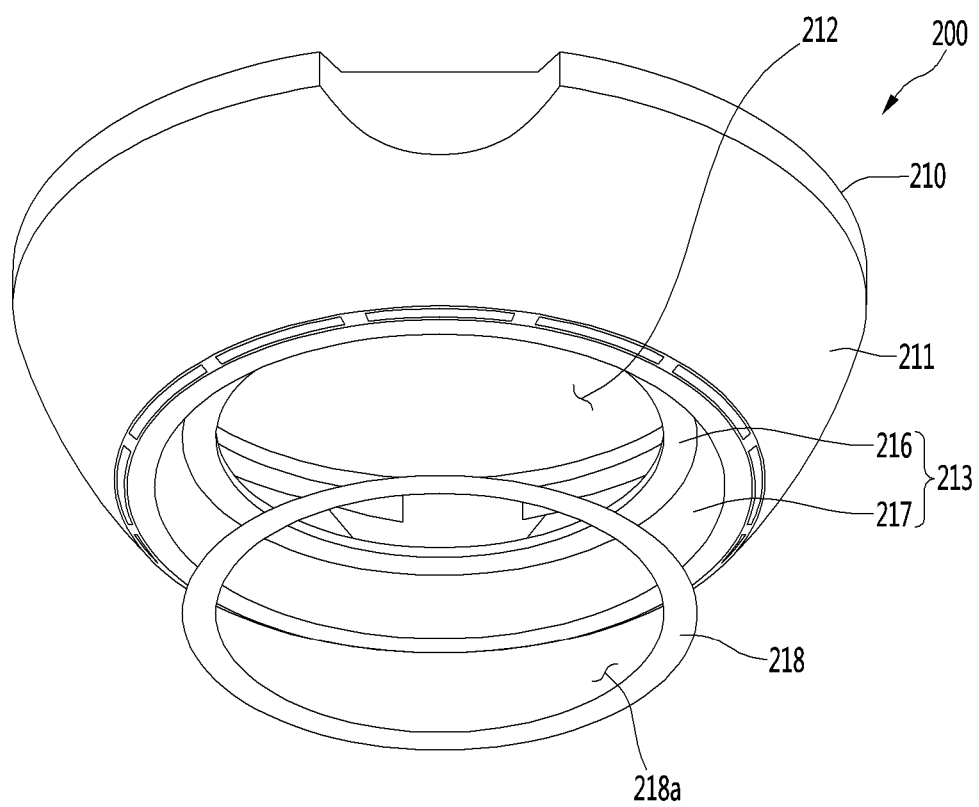
FIG. 10 is an exploded perspective view of the spin body and the spacer according to an embodiment.
Figure 11:
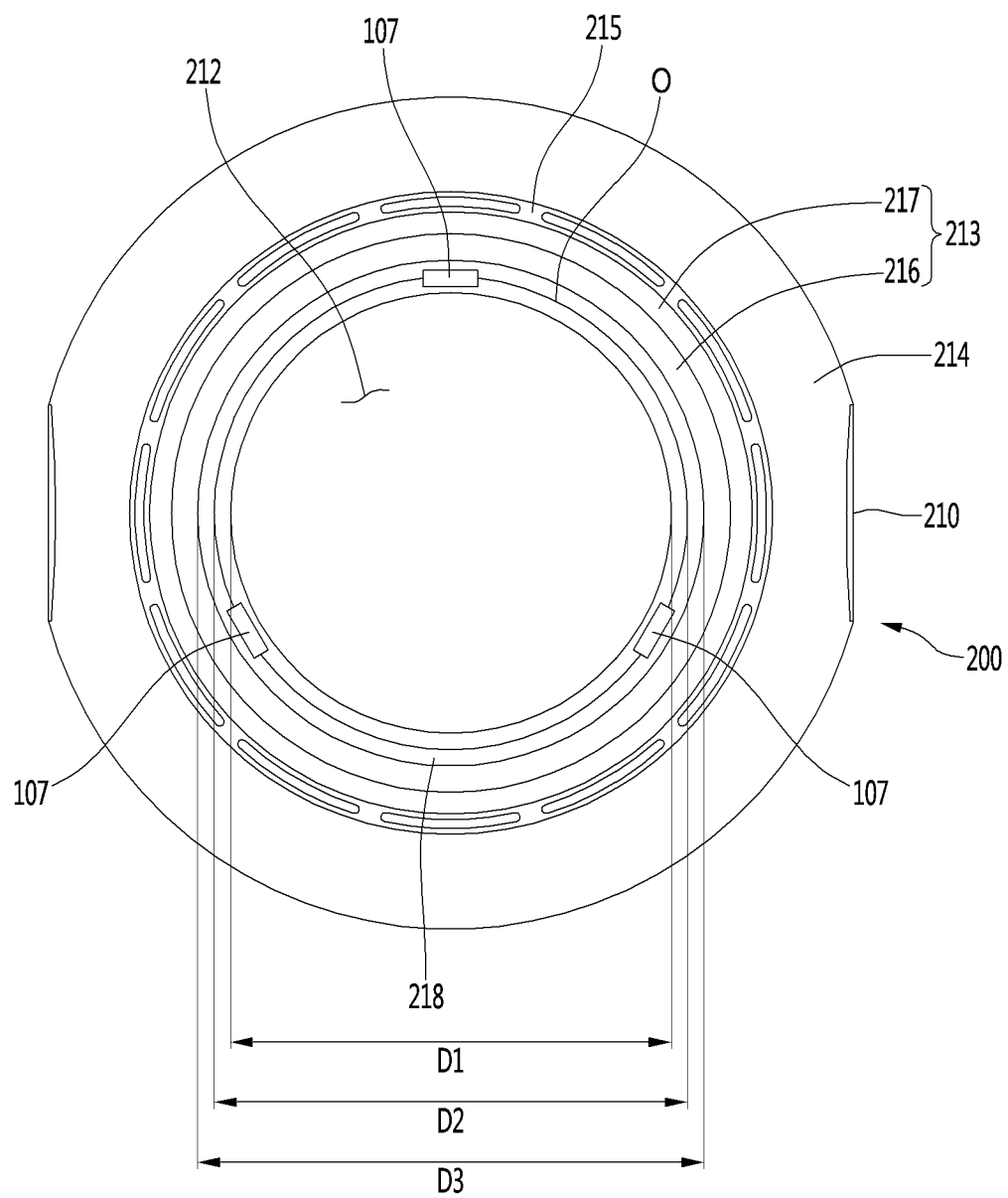
FIG. 11 is a bottom view of the spin body and the bearing according to an embodiment.

Referring to FIGS. 10-11, the spacer 218 may have a closed loop cross-sectional shape. A base through-hole 218a, through which part of the base 100 passes, may be formed at the center of the spacer 218. The inner diameter D1 of the spacer 218 may be smaller than the diameter D2 of the virtual circle O connecting the plurality of bearings.

The outer diameter D3 of the spacer 218 may be larger than the diameter D2 of the virtual circle O. The spacer 218 may be in contact with the outer surface of the bearing 107 in a state of being accommodated in the space formed inside the inner hollow body 213. The outer circumference of the spacer 218 may be directed to the inner circumferential surface of the inner hollow body 213 in the horizontal direction.

According to embodiments, the spacer may minimize the wear of the spin body, thereby minimizing the damage to the spin body and extending the life of the spin body. In addition, the spin body may protect the spacer and the bearing and minimize the penetration of foreign matters between the spin body and the base.

In addition, a speaker may be disposed inside the spin body to be compact, and may maximally reduce the center of gravity of the robot, thereby minimizing the overturning of the robot. Embodiments provide a robot capable of minimizing wear of a spin body.

In one embodiment, a robot may include: a base; at least one rolling bearing having an inner ring supported to the base and an outer ring rotated along the inner ring; a spacer contacting the outer ring; a spin body to which the spacer is attached; and a spin mechanism coupled to the spin body to rotate the spin body. The spacer may separate the spin body from the rolling bearing between the spin body and the rolling bearing. A surface hardness of the spacer may higher than a surface hardness of the spin body.

The surface hardness of the spacer may be lower than a surface hardness of the outer ring. The spacer may have a closed loop cross-sectional shape. The outer ring may be made of a metal material, the spacer may be made of a PE material, and the base may be made of an ABS material.

A lower surface of the spacer may be an outer ring contact surface that is seated on the outer ring, and a top surface of the spacer may be attached to the spin body by an adhesive member. A thickness of the spacer may be less than a thickness of the outer ring. An inner diameter of the spacer may be smaller than a diameter of a virtual circle connecting a plurality of bearings.

An outer diameter of the spacer may be larger than the diameter of the virtual circle. The spin body may include: a first body having a bottom surface to which the spacer is attached, and a second body extending from the first body and surrounding a gap between the base and the first body and an outer circumference of the spacer.

The spin body may further include a third body extending from the second body and surrounding an outer circumference of the second body. The robot may further include a speaker disposed inside the spin body.

The details of one or more embodiments are set forth in the accompanying drawings and the description below. Other features will be apparent from the description and drawings, and from the claims.

The above description is merely illustrative of the technical idea of the present disclosure, and various modifications and changes may be made thereto by those skilled in the art without departing from the essential characteristics of the present disclosure.

Therefore, the embodiments of the present disclosure are not intended to limit the technical spirit of the present disclosure but to illustrate the technical idea of the present disclosure, and the technical spirit of the present disclosure is not limited by these embodiments.

The scope of protection of the present disclosure should be interpreted by the appending claims, and all technical ideas within the scope of equivalents should be construed as falling within the scope of the present disclosure.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A robot comprising:
   a base;
   at least one roller bearing having an inner race supported by the base, an outer race that rotates around the inner race, and at least one roller provided between the inner race and the outer race;
   a spacer that contacts the outer race;
   a first body to which the spacer is attached; and
   a spin motor coupled to the first body and configured to provide a torque to rotate the first body with respect to the base,
   wherein the outer race of the at least one roller bearing is configured to roll along the spacer,
   wherein a surface hardness of the spacer is greater than a surface hardness of the first body,
   wherein the first body rotates about a vertical axis with respect to the base,
   wherein a top surface of the spacer is attached to the first body by an adhesive member, and a bottom surface of the spacer is seated on the outer race,
   wherein the surface hardness of the spacer is less than a surface hardness of the outer race, and
   wherein the first body includes:
      a first section having a bottom surface to which the spacer is attached, and
      a second section that extends from the first section and shrouds a gap between the base and the first section and an outer circumference of the spacer.

2. The robot according to claim 1, wherein the spacer has a closed loop cross-sectional shape.

3. The robot according to claim 1, wherein the outer race is made of a metal material, the spacer is made of a polyethylene (PE) plastic material, and the base is made of an ABS plastic material.

4. The robot according to claim 1, wherein an axial thickness of the spacer is less than a radial thickness of the outer race.

5. The robot according to claim 1, wherein an axial thickness of the at least one roller bearing is less than a radial thickness of the spacer.

6. The robot according to claim 1, wherein the first body further comprises a third section that extends from the second section and shrouds an outer circumference of the second section.

7. The robot according to claim 1, further comprising a speaker provided inside the first body.

8. The robot according to claim 1, wherein the at least one roller bearing rotates about a horizontal axis.

9. A robot comprising:
   a base including at least one bearing support;
   a first body configured to be rotated with respect to the base about a vertical axis;
   at least one bearing attached to the base and supported by the at least one bearing support;
   a spacer attached to an underside of the first body, and along which the at least one bearing is configured to roll,
   wherein the at least one bearing comprises:
      a support shaft connected to the at least one bearing support;
      an inner race attached to the support shaft;
      an outer race in contact with the spacer and configured to rotate around the support shaft; and
      at least one roller provided between the inner race and the outer race, wherein a bottom of the first body is lower than a bottom of the at least one bearing, wherein a top surface of the spacer is attached to the first body by an adhesive member, and a bottom surface of the spacer is seated on the outer race, wherein a surface hardness of the spacer is less than a surface hardness of the outer race, and wherein the first body includes:
- a first section having a bottom surface to which the spacer is attached, and
- a second section that extends from the first section and shrouds a gap between the base and the first section and an outer circumference of the spacer.

10. The robot according to claim 9, wherein the surface hardness of the spacer is higher than a surface hardness of the first body.

11. The robot according to claim 9, wherein a radial thickness of the spacer is greater than an axial thickness of the at least one bearing.

12. The robot according to claim 9, further comprising a speaker provided inside the first body.

13. The robot according to claim 9, further comprising a second body configured to be rotated with respect to the first body about a horizontal axis.

14. The robot according to claim 13, further comprising an interface module mounted on the second body.

15. The robot according to claim 14, wherein the interface module comprises a display, a camera and a microphone.

16. The robot according to claim 9, wherein the at least one bearing is configured to rotate about a horizontal axis.

* * * * *